Figure 1:
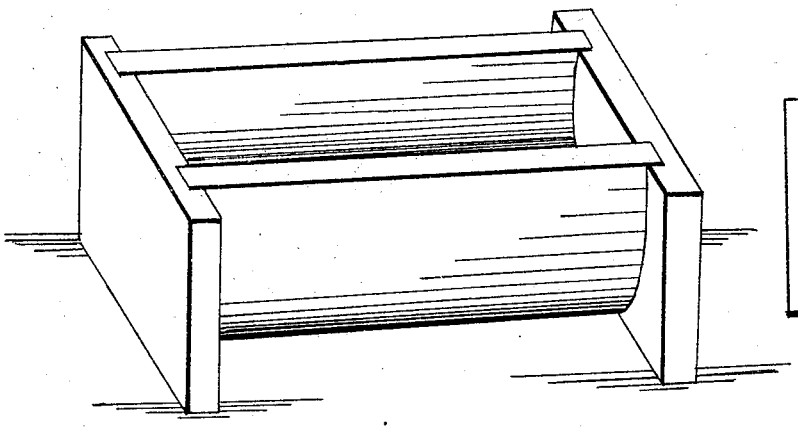
Figure 3:
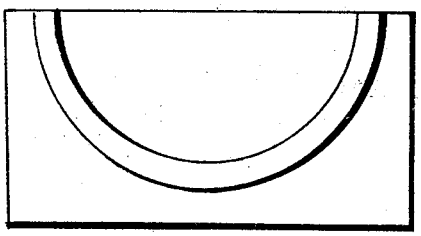
Figure 2:
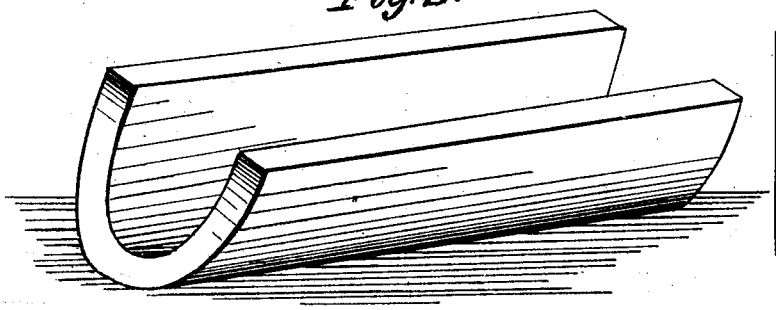
Figure 4:
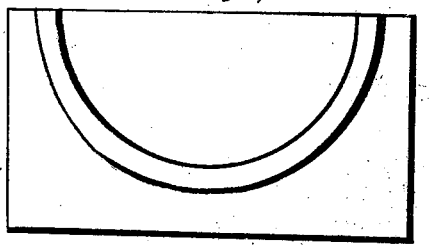

No Printed Specification Available

2850X

J. Purdy,

Sap Bucket.

Patented Oct. 4. 1817.

Witnesses:

Inventor:

N. PETERS, PHOTO-LITHOGRAPHER. WASHINGTON, D. C.

United States Patent Office

PTO - BOYERS, PA Duty Station

MISSING PAGE TEMPORARY NOTICE

PATENT # 2850X FOR ISSUE DATE 10-4-1817

HAS BEEN SCANNED, BUT WITH MISSING PAGE(S). UPON RECEIVING OF MISSING PAGE(S), THE ENTIRE DOCUMENT WILL RE RESCANNED. PLEASE CALL IMAGE DATA ADMINISTRATION STAFF OF 557-6154 IF YOU HAVE A QUESTION. ASK FOR DAVE GROOMS, ANITA YOUNG OR POLA JONES.

THIS NOTICE IS FOR THE MISSING PAGE CONTAINING:

COLUMN # All text

Data Conversion Operation

Boyers, Pa